(12) United States Patent
Iyer et al.

(10) Patent No.: US 11,086,382 B2
(45) Date of Patent: Aug. 10, 2021

(54) COMPENSATING FOR LOW BATTERY CHARGE LEVELS OF A BATTERY IN AN INFORMATION HANDLING SYSTEM

(71) Applicant: Dell Products L.P., Round Rock, TX (US)

(72) Inventors: Vivek Viswanathan Iyer, Austin, TX (US); Michael S. Gatson, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/725,675

(22) Filed: Dec. 23, 2019

(65) Prior Publication Data
US 2021/0191497 A1 Jun. 24, 2021

(51) Int. Cl.
| | |
|---|---|
| *G06F 1/32* | (2019.01) |
| *G06F 1/3218* | (2019.01) |
| *G06F 1/26* | (2006.01) |
| *G06F 1/3212* | (2019.01) |
| *G06F 1/3234* | (2019.01) |
| *H02J 7/00* | (2006.01) |
| *G06F 1/3203* | (2019.01) |

(52) U.S. Cl.
CPC ............ *G06F 1/3218* (2013.01); *G06F 1/266* (2013.01); *G06F 1/325* (2013.01); *G06F 1/3212* (2013.01); *H02J 7/0048* (2020.01); *G06F 1/3203* (2013.01); *G09G 2320/0626* (2013.01); *G09G 2330/021* (2013.01)

(58) Field of Classification Search
CPC ...... G06F 1/3218; G06F 1/266; G06F 1/3212; G06F 1/325; H02J 7/0048; G09G 2320/0626; G09G 2330/021
USPC .......................................................... 713/320
See application file for complete search history.

(56) References Cited

U.S. PATENT DOCUMENTS

| | | | | |
|---|---|---|---|---|
| 8,448,001 B1* | 5/2013 | Zhu | ........................ | G06F 1/3209 713/322 |
| 9,848,380 B1* | 12/2017 | Ekambaram | ...... | H04W 52/0209 |
| 2011/0215966 A1* | 9/2011 | Kim | .................. | H04W 52/0261 342/357.29 |
| 2011/0239011 A1* | 9/2011 | Waris | ................ | H04M 1/72457 713/310 |

(Continued)

*Primary Examiner* — Volvick Derose
(74) *Attorney, Agent, or Firm* — Baker Botts L.L.P.

(57) ABSTRACT

Compensating for low battery charge levels of a battery in a primary information handling system, performing, at a first time, a calibration and configuration of a battery management model, including: performing, at a second time, a steady-state monitoring of the primary information handling system, including: in response to monitoring the contextual inputs and based on the battery charge level of the battery of the primary information handling system, i) accessing the battery management model including the configuration policy, ii) identifying one or more of the configuration rules based on the monitored parameters associated with the contextual inputs, and iii) applying the one or more configuration rules to perform one or more of the computer-implemented actions to automatically transfer content data of the primary information handling system to the secondary information handling system that is associated with the primary information handling system without user interaction.

20 Claims, 3 Drawing Sheets

(56) References Cited

U.S. PATENT DOCUMENTS

| | | | |
|---|---|---|---|
| 2011/0300875 A1* | 12/2011 | Kim | G01S 19/47 455/456.1 |
| 2013/0262891 A1* | 10/2013 | Gudlavenkatasiva | G06F 1/3212 713/320 |
| 2014/0091623 A1* | 4/2014 | Shippy | H02J 7/0068 307/31 |
| 2015/0362976 A1* | 12/2015 | Caliendo, Jr. | G06F 1/3218 713/320 |
| 2016/0150072 A1* | 5/2016 | Rangarajan | H04W 52/0277 455/574 |
| 2016/0291671 A1* | 10/2016 | Rider | G06F 1/3231 |
| 2016/0302148 A1* | 10/2016 | Buck | H04W 72/0493 |
| 2017/0086732 A1* | 3/2017 | Tribble | A61B 5/0022 |
| 2019/0037453 A1* | 1/2019 | Wang | H04W 76/18 |
| 2019/0053114 A1* | 2/2019 | Karimli | H04W 36/14 |
| 2019/0223098 A1* | 7/2019 | Ah Sue | H04W 52/02 |
| 2019/0356137 A1* | 11/2019 | Balarajashetty | H02J 7/008 |
| 2020/0204440 A1* | 6/2020 | Viswanathan | H04L 67/12 |
| 2020/0303938 A1* | 9/2020 | Owen | H02J 7/00034 |
| 2020/0367164 A1* | 11/2020 | Gupta | G06N 3/08 |

* cited by examiner

COMPENSATING FOR LOW BATTERY CHARGE LEVELS OF A BATTERY IN AN INFORMATION HANDLING SYSTEM

BACKGROUND

Field of the Disclosure

The disclosure relates generally to an information handling system, and in particular, compensating for low battery charge levels of a battery in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Immersive productivity focuses on creating an immersive environment that allows a user of an information handling system to stay in his/her work flow. The creation of the immersive environment centers on the elimination of external distractions, providing assistance to the user on key tasks, and augmented capabilities to improve productivity. The elimination of distractions includes blocking interruptions such as notifications and alerts, as well as providing indications such as do-not-disturb to other parties. Assistance to the user includes contextually-driven actions and performance enhancements based on the users' current tasks.

SUMMARY

Innovative aspects of the subject matter described in this specification may be embodied in a method including performing, at a first time, a calibration and configuration of a battery management model, including identifying contextual data associated with contextual inputs to the information handling system, the contextual data including user settings contextual data, system settings contextual data, and environmental settings contextual data; training, based on the contextual data, the battery management model, including generating a configuration policy including configuration rules, the configuration rules for performing computer-implemented actions to automatically transfer content data of the primary information handling system to a secondary information handling system that is associated with the primary information handling system without user interaction; performing, at a second time, a steady-state monitoring of the primary information handling system, including: monitoring the contextual inputs of the primary information handling system; identifying a battery charge level of the battery of the primary information handling system; and in response to monitoring the contextual inputs and based on the battery charge level of the battery of the primary information handling system, i) accessing the battery management model including the configuration policy, ii) identifying one or more of the configuration rules based on the monitored parameters associated with the contextual inputs, and iii) applying the one or more configuration rules to perform one or more of the computer-implemented actions to automatically transfer content data of the primary information handling system to the secondary information handling system that is associated with the primary information handling system without user interaction.

Other embodiments of these aspects include corresponding systems, apparatus, and computer programs, configured to perform the actions of the methods, encoded on computer storage devices.

These and other embodiments may each optionally include one or more of the following features. For instance, the configuration rules further include configuration rules for performing computer-implemented actions to automatically throttle one or more systems of the primary information handling system without user interaction. Applying the one or more configuration rules further includes applying the one or more configuration rules to perform computer-implemented actions to automatically throttle one or more systems of the primary information handling system without user interaction. Applying the one or more configuration rules includes adjusting a brightness level of a display of the primary information handling system. Applying the one or more configuration rules to perform one or more of the computer-implemented actions to automatically transfer content data of the primary information handling system to the secondary information handling system further includes transferring metadata associated with the content data of the primary information handling system to the secondary information handling system. Applying the one or more configuration rules to perform one or more of the computer-implemented actions to automatically transfer content data of the primary information handling system to the secondary information handling system further includes identifying the secondary information handling system from a plurality of secondary information handling systems based on a proximity of the secondary information handling systems to the primary information handling system. Applying the one or more configuration rules to perform one or more of the computer-implemented actions to automatically transfer content data of the primary information handling system to the secondary information handling system further includes identifying the secondary information handling system from a plurality of secondary information handling systems based on a priority listing of the secondary information handling systems. Performing the steady state monitoring of the primary information handling system further includes: identifying a calendar event associated with the primary information handling system; and in response to identifying the calendar event and the battery charge level, i) accessing the battery management model including the configuration policy, ii) identifying one or more of the configuration rules based on the monitored parameters associated with the contextual inputs, and iii) applying the one or more configuration rules to perform one or more of the computer-implemented actions to automatically transfer content data of the primary information handling system to the secondary information handling system that is associated with the primary information handling system without user interaction.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
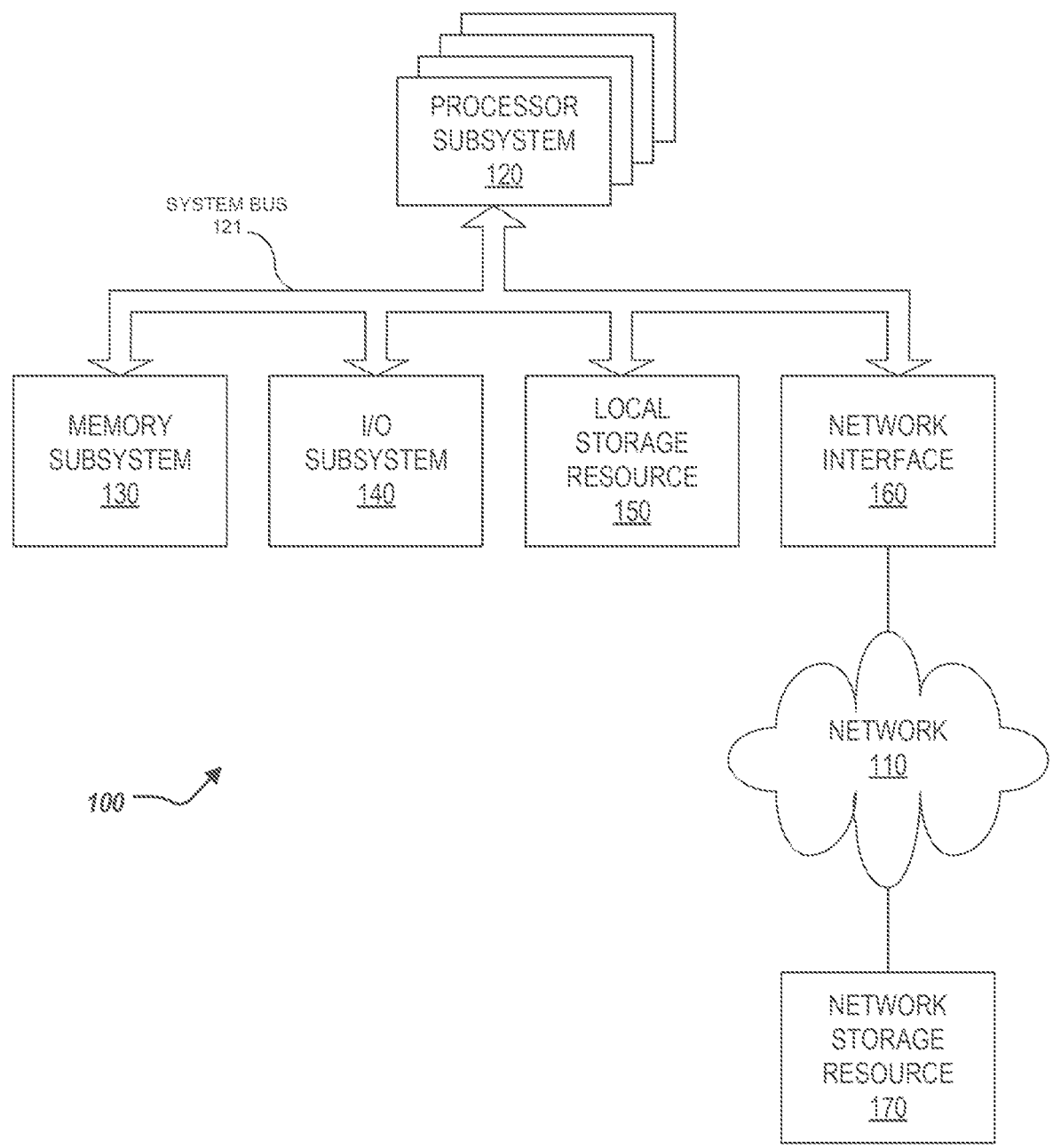
FIG. 1 is a block diagram of selected elements of an embodiment of an information handling system.
Figure 2:
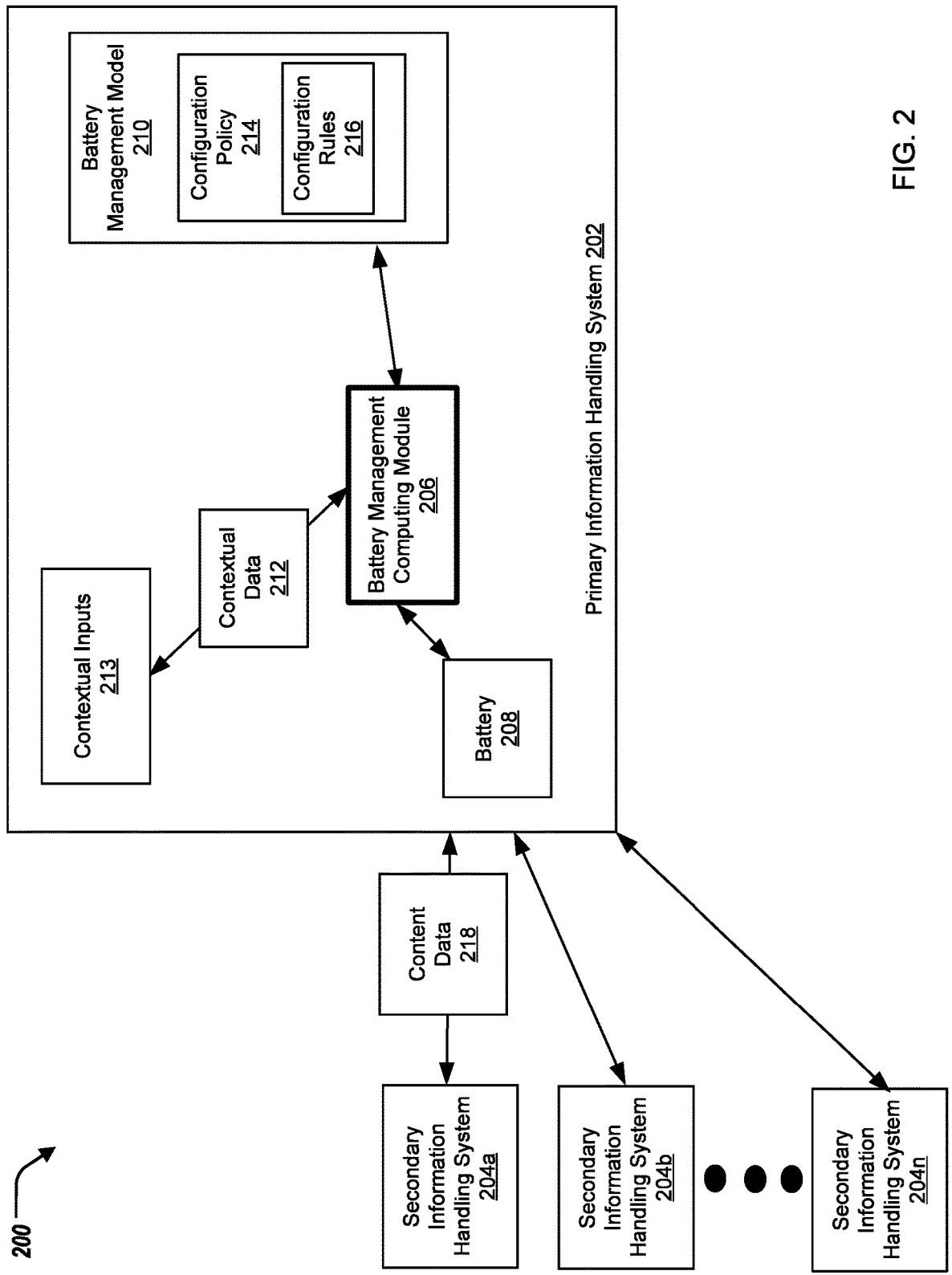
FIG. 2 illustrates a block diagram of the information handling system for compensating for low battery charge levels of a battery in the information handling system.
Figure 3:
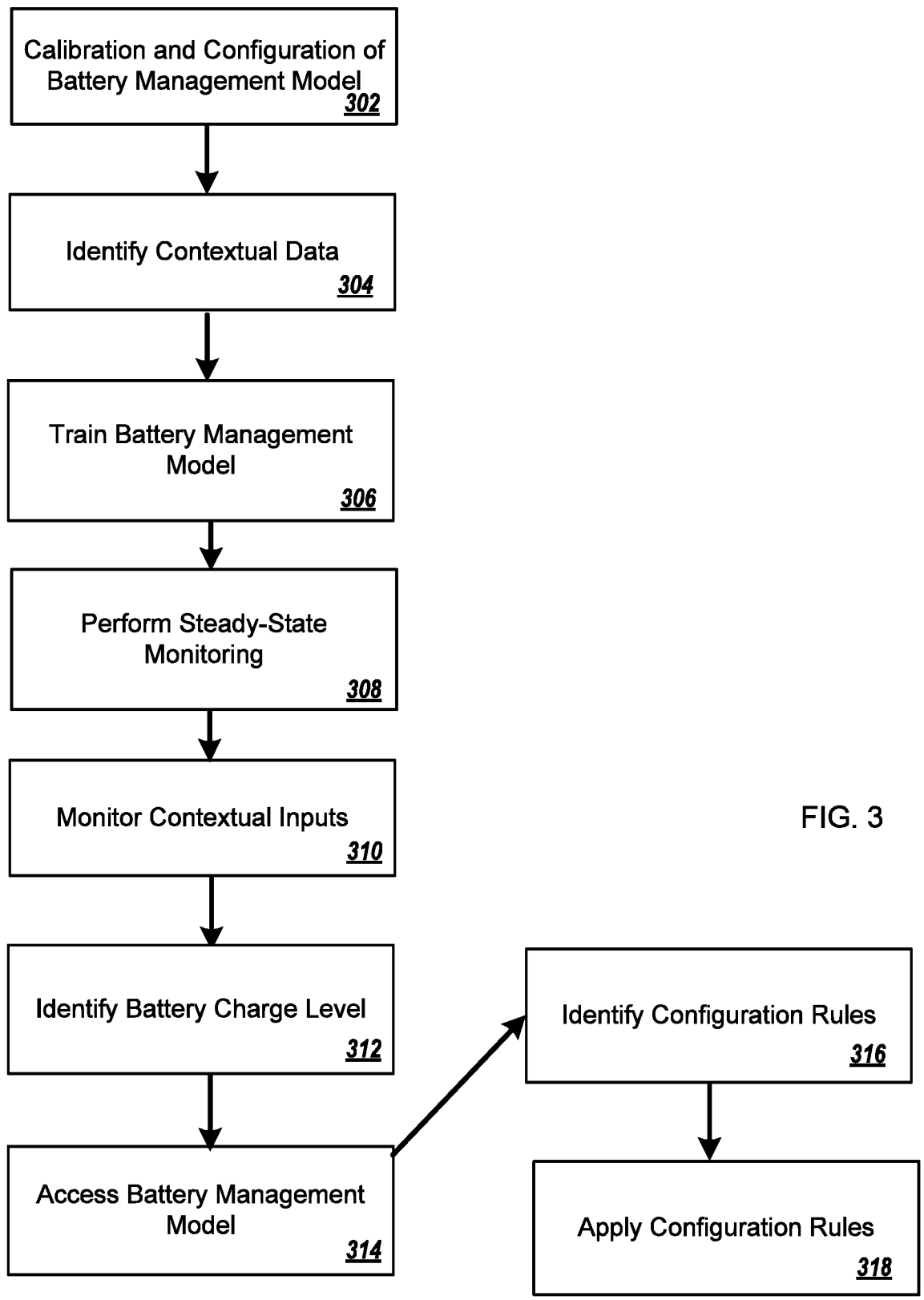
FIG. 3 illustrates a method for compensating for low battery charge levels of the battery in the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates a computing environment 200 including a primary information handling system 202 and a plurality of secondary information handling systems 204a, 204b, . . . , 202n (collectively referred to as secondary information handling systems 204). The primary information handling system 202 can be in communication with one or more of the secondary information handling systems 204. The primary information handling system 202 can include a battery management computing module 206 and a battery 208 (or battery source 208). The battery management computing module 206 can be in communication with the battery 208. In some examples, the primary information handling system 202 and/or the secondary information handling system 204 is similar to, or includes, the information handling system 100 of FIG. 1.

In short, the computing environment 200 can facilitate eliminating battery distractions associated with the primary information handling system 202 when used by a user of the primary information handling system 202 to provide increased user efficiency, productivity, and enhanced immersion by the user. To eliminate the battery distractions, the primary information handling system 202 can offload content to the secondary information handling system 204, or extend a battery life of the battery 208 of the primary information handling system 202, described further herein. In some examples, battery distractions can include battery charge depletion resulting in shut down of the primary information handling system 202, low battery charge resulting in slow down of the primary information handling system 202 (e.g., processing slow down), and other distractions that can result in a loss of user productivity and/or user immersion when using the primary information handling system 202.

In some embodiments, the battery management computing module 206 can perform, at a first time, a calibration and configuration of a battery management model 210. Specifically, performing of the calibration and the configuration of the battery management model 210 can include identifying contextual data 212 associated with contextual inputs 213 of the information handling system 202. Specifically, the contextual data 212 can include such contextual data as user settings contextual data, system settings contextual data, and environment settings contextual data. For example, the user settings contextual data 212 can include such contextual data as calendar contextual data including a schedule of the user, and scheduled events of the user, including when an event is scheduled and its duration. The user settings contextual data 212 can include a time of day associated with the primary information handling system 202. The user settings contextual data 212 can include such contextual data as active applications (e.g., applications "in focus") of the primary information handling system 202. The system settings contextual data can include such contextual data as a location of the primary information handling system 202 (e.g. indoor location or outdoor location); types of devices/peripherals coupled/connected to the primary information handling system 202; period of operation of the battery 208, and length of such operation of the battery 208. The environmental settings contextual data can include a brightness of an environment surrounding the primary information handling system 202.

In some examples, identifying of the contextual data 212 related to active applications (e.g., applications "in focus") of the primary information handling system 202 can be optional (e.g., user option).

In some examples, the contextual data 212 can include battery profile information of the battery 208. For example, the battery profile information can include when (e.g., a time of day, the duration, and the specific day) the primary information handling system 202 is connected to a power source (e.g., DC outlet) or drawing power from the battery 208. The battery profile information can further include a degradation state of the battery 208.

The battery management computing module 206 can train, based on the contextual data 212, the battery management model 210. Specifically, the battery management computing module 206 can generate, based on the contextual data 212 identified at the first time, a configuration policy 214 that includes configuration rules 216. In some examples, the configuration rules 216 are rules for automatically performing computer-implemented actions for transferring content data 218 of the primary information handling system 202 to the secondary information handling system 204 without user interaction. For example, the battery management computing module 206 can train the battery management model 210 such that based on the contextual data 212, the battery management model 210 can indicate that the battery 208 may not be able to sustain the processing needs of the primary information handling system 202.

In some examples, the configuration rules 216 are rules for automatically performing computer-implemented actions for throttling of systems of the primary information handling system 202 without user interaction.

To that end, the battery management computing module 206 can train the battery management model 210 to establish connections between the contextual data 212 and the configuration rules 216. Specifically, the battery management model 210 can identify one or more configurations rules 216 to be applied based on a connection with one or more of the contextual data 212. In some examples, the battery management computing module 206 can train the battery management model 210 using a machine learning process, and/or a neural network.

In some examples, the configuration rules 216 can include automatically identifying the secondary information handling system 204a from the plurality of secondary information handling systems 204; and automatically establishing a connection with the secondary information handling system 204a. In some examples, the configuration rules 216 for identifying the secondary information handling system 204a from the plurality of secondary information handling system 204 can include identifying the secondary information handling system 204a based on a proximity of the second information handling system 204a to the primary information handling system 202. For example, the configuration rules 216 can identify the secondary information handling system 204a that is the closest in proximity to the primary information handling system 202. In some examples, the configuration rules 216 for identifying the secondary information handling system 204a from the plurality of secondary information handling system 204 can include identifying the secondary information handling system 204a based on a priority listing of the secondary information handling systems 204. For example, the configuration rules 216 can identify the secondary information handling system 204a having a highest priority as related to the primary information handling system 202. In some examples, the configuration rules 216 for identifying the secondary information handling system 204a from the plurality of secondary information handling system 204 can include identifying the secondary information handling system 204a based on a processing capability of each of the secondary information handling systems 204. For example, the configuration rules 216 can identify the secondary information handling system 204a having the greatest processing capability/power as compared to the remaining secondary information handling systems 204.

In some examples, each of the secondary information handling systems 204 can have a pre-existing communication relationship with the primary information handling system 202. That is, each of the secondary information handling systems 204 is capable of receiving from the primary information handling system 202 (described further herein) without the need to establish such communication channels between the secondary information handling system 204 and the primary information handling system 202.

In some examples, the configuration rules 216 can include automatically providing a notification for display on the primary information handling system 202.

In some examples, the configuration rules 216 can include automatically shutting down (e.g., an off state) one or more systems of the primary information handling system 202. In some examples, the configuration rules 216 can include automatically adjusting a brightness level of a display of the primary information handling system 202.

In some implementations, the battery management computing module 206 can perform, at a second time after the first time, a steady-state monitoring of the primary information handling system 202. In other words, the battery management computing module 206 can monitor the primary information handling system 202, and in particular, the contextual inputs 213, for computer-related events that could trigger activation of the configurations rules 216 by the battery management computing module 206.

Specifically, the battery management computing module 206 can monitor the contextual inputs 213 of the primary information handling system 202. In some examples, the battery management computing module 206 can monitor contextual data such as user settings contextual data, system settings contextual data, and environment settings contextual data. For example, the battery management computing module 206 can monitor the calendar contextual data associated with the primary information handling system 202, including event data associated with the calendar contextual data; a time of day associated with the primary information handling system 202; active applications of the primary information handling system 202; a location of the primary information handling system 202; types of devices/peripherals coupled/connected to the primary information handling system 202; and a brightness of the environment surrounding the primary information handling system 202.

The battery management computing module 206 can identify a battery charge level of the battery 208 of the primary information handling system 202. That is, the battery management computing module 206 can monitor the battery profile information of the battery 208 to identify the battery charge level of the battery 208. The battery charge level of the battery 208 can indicate a percentage of available battery resources of the battery 208, and/or a quantity (e.g. milli-amperes) available of the battery 208.

In some implementations, the battery management computing module 206 can, in response to monitoring the contextual inputs 213 and based on the battery charge level of the battery 208, access the battery management model 210 including the configuration policy 214. The battery management computing module 206 can further identify one or more of the configuration rules 216 based on the monitored contextual inputs 214. Furthermore, the battery management computing module 206 can apply the configuration rules 206 to the primary information handling system 202. In other words, the battery management computing module 206 can apply appropriate configuration rules 216 based on the monitored contextual inputs 214. That is, the battery management computing module 206 can apply the configuration rules 206 to the primary information handling system 202 to perform computer-implemented actions to automatically transfer content data 218 of the primary information handling system 202 to the secondary information handling system 204a that is associated with the primary information handling system 202 without user interaction. In some examples, the battery management computing module 206 can apply the configuration rules 206 to the primary information handling system 202 to perform computer-implemented actions to automatically throttle one or more systems of the primary information handling system 202 without user interaction.

In some examples, the battery management computing module 206, prior to automatically transferring the content data 218 of the primary information handling system 202 to the secondary information handling system 204a, can establish a communication with the secondary information handling system 204a indicating that such transfer of content is forthcoming, and receive approval from the secondary information handling system 204a for such transfer of content. In some examples, the secondary information handling system 204a can reject such transfer of content from the primary information handling system 204a (or fail to respond to the request). The battery management computing module 206 can then apply the configuration rules 206 to the primary information handling system 202 to identify one of the remaining secondary information handling systems 204 to transfer such content to (e.g., based on proximity, or priority list, as indicated herein).

For example, the battery management computing module 206 can monitor the contextual inputs 213 and determine that the contextual data 212 indicates that the calendar event data indicates an upcoming event for a specific duration, the current time, and identify the battery charge level. In response, the battery management computing module 206 can access the battery management model 210, identify the configuration rules 216 that are applicable to determining the upcoming event for a specific duration, the current time, and the battery charge level, and apply such configuration rules 216. The battery management model 210 can further indicate that based on the specific duration, the current time, and the battery charge level, that the battery 208 may not be able to sustain processing needs of the primary information handling system 202.

For example, the battery management computing module 206 can determine that the contextual data 212 indicates that the upcoming event is scheduled from 2 pm-3 pm, the current time is 145 pm, and the battery charge level is 15% of full capacity. In response, the battery amendment computing module 206 can access the battery management model 210, identify the configuration rules 216 that are applicable to determining the that the upcoming event is scheduled from 2 pm-3 pm, the current time is 145 pm, and the battery charge level is 15% of full capacity, and apply such configuration rules. That is, the battery management model 210 can indicate that based on the upcoming event that is scheduled from 2 pm-3 pm, the current time is 145 pm, and the battery charge level is 15%, the battery 208 may not be able to sustain processing needs of the primary information handling system 202 for the duration of the schedule event. For example, the battery management computing module 206 can apply configuration rules 216 such as identifying the secondary information handling system 204a, and transferring content data 218 to the secondary information handling system 204a without user interaction. For example, the battery management computing module 206 can apply configuration rules 216 such as providing a notification for display on the primary information handling system 202. For example, the battery management computing module 206 can apply configuration rules 216 such as throttling systems of the primary information handling system 202 without user interaction. Specifically, the battery management computing module 206 can applying configuration rules such as adjusting a brightness level of a display of the primary information handling system 202 to reduce battery drain/usage of the battery 208.

In some examples, applying the configuration rules 216 to perform one or more of the computer-implemented actions to automatically transfer the content data 208 of the primary information handling system 202 to the secondary information handling system 204a further includes transferring metadata associated with the content data 208 of the primary information handling system 202 to the second information handling system 204a. For example, when the content data 218 include presentation-based content data (e.g., slideshow-based content data), the metadata can include slide/page data, slide/page notes, and/or session notes (e.g., session OneNote).

In some examples, applying the configuration rules 216 to perform one or more of the computer-implemented actions to automatically transfer the content data 208 of the primary information handling system 202 to the secondary information handling system 204a further includes identifying the secondary information handling system 204a from the plurality of secondary information handling systems 204 based on a proximity of the second information handling system 204a to the primary information handling system 202. For example, applying the configuration rules 216 can include identifying the secondary information handling system 204a that is the closest in proximity to the primary information handling system 202.

In some examples, applying the configuration rules 216 to perform one or more of the computer-implemented actions to automatically transfer the content data 208 of the primary information handling system 202 to the secondary information handling system 204a further includes identifying the secondary information handling system 204a from the plurality of secondary information handling systems 204 based on a priority listing of the second information handling systems 204. For example, applying the configuration rules 216 can include identifying the secondary information handling system 204a having a highest priority as related to the primary information handling system 202.

In some examples, applying the configuration rules 216 to perform one or more of the computer-implemented actions to automatically transfer the content data 208 of the primary information handling system 202 to the secondary information handling system 204a further includes identifying the secondary information handling system 204a from the plurality of secondary information handling systems 204 based on a processing capability of each of the secondary information handling systems 204. For example, applying the configuration rules 216 can include identifying the secondary information handling system 204a having a greatest processing capability/power as compared to the remaining secondary information handling systems 204.

FIG. 3 illustrates a flowchart depicting selected elements of an embodiment of a method 300 for compensating for low battery charge levels of the battery 208 in the primary information handling system 202. The method 300 may be performed by the primary information handling system 202 and/or the battery management computing module 206, and with reference to FIGS. 1-2. It is noted that certain operations described in method 300 may be optional or may be rearranged in different embodiments.

The battery management computing module 206 performs, at a first time, a calibration and configuration of the battery management model 210 (302). The battery management computing module 206 identifies contextual data 212 associated with contextual inputs 213 of the primary information handling system 202 (304). In some examples, the contextual data 212 can include such contextual data as user settings contextual data, system settings contextual data, and environment settings contextual data. The battery management computing module 206 can train, based on the contextual data 212, the battery management model 210 (306). In some examples, the battery management computing module 206 can generate, based on the contextual data 212 identified at the first time, a configuration policy 214 that includes configuration rules 216. In some examples, the configuration rules 216 are rules for automatically performing computer-implemented actions for transferring content data 218 of the primary information handling system 202 to the secondary information handling system 204 without user interaction. In some examples, the configuration rules 216 are rules for automatically performing computer-implemented actions for throttling of systems of the primary information handling system 202 without user interaction.

The battery management computing module 206 can perform, at a second time after the first time, a steady-state monitoring of the primary information handling system 202 (308). The battery management computing module 206 can monitor the contextual inputs 214 of the primary information handling system 202 (310). The battery management computing module 206 can identify a battery charge level of the battery 208 of the primary information handling system 202 (312). The battery management computing module 206 can, in response to monitoring the contextual inputs 214 and based on the battery charge level of the battery 208, access the battery management model 210 including the configuration policy 214 (314). The battery management computing module 206 can identify one or more of the configuration rules 216 based on the monitored contextual inputs 214 (316). The battery management computing module 206 can apply the configuration rules 206 to the primary information handling system 202 (318).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for compensating for low battery charge levels of a battery in a primary information handling system, comprising:

performing, at a first time, a calibration and configuration of a battery management model, including:
identifying contextual data associated with contextual inputs to the information handling system, the contextual data including user settings contextual data, system settings contextual data, and environmental settings contextual data;
training, based on the contextual data, the battery management model, including generating a configuration policy including configuration rules, the configuration rules for performing computer-implemented actions to automatically transfer content data of the primary information handling system to a secondary information handling system of a plurality of secondary information handling systems that is associated with the primary information handling system without user interaction;

performing, at a second time, a steady-state monitoring of the primary information handling system, including:
monitoring the contextual inputs of the primary information handling system;
identifying a battery charge level of the battery of the primary information handling system; and
in response to monitoring the contextual inputs and based on the battery charge level of the battery of the primary information handling system:
identifying a particular secondary information handling system from the plurality of secondary information handling systems;
establishing a communication with the particular secondary information handling system indicating a transfer of content data from the primary information handling system;
receiving an indication that the transfer of content to the particular secondary information handling system is rejected, and in response:

i) identifying a different secondary information handling system from the plurality of secondary information handling systems, ii) accessing the battery management model including the configuration policy, iii) identifying one or more of the configuration rules based on the monitored parameters associated with the contextual inputs, and iv) applying the one or more configuration rules to perform one or more of the computer-implemented actions to automatically transfer content data of the primary information handling system to the different secondary information handling system that is associated with the primary information handling system without user interaction.

2. The computer-implemented method of claim 1, wherein the configuration rules further include configuration rules for performing computer-implemented actions to automatically throttle one or more systems of the primary information handling system without user interaction.

3. The computer-implemented method of claim 2, wherein applying the one or more configuration rules further includes applying the one or more configuration rules to perform computer-implemented actions to automatically throttle one or more systems of the primary information handling system without user interaction.

4. The computer-implemented method of claim 3, wherein applying the one or more configuration rules includes adjusting a brightness level of a display of the primary information handling system.

5. The computer-implemented method of claim 1, wherein applying the one or more configuration rules to perform one or more of the computer-implemented actions to automatically transfer content data of the primary information handling system to the different secondary information handling system further includes transferring metadata associated with the content data of the primary information handling system to the different secondary information handling system.

6. The computer-implemented method of claim 1, wherein applying the one or more configuration rules to perform one or more of the computer-implemented actions to automatically transfer content data of the primary information handling system to the different secondary information handling system further includes identifying the different secondary information handling system from the plurality of secondary information handling systems based on a proximity of the secondary information handling systems to the primary information handling system.

7. The computer-implemented method of claim 1, wherein applying the one or more configuration rules to perform one or more of the computer-implemented actions to automatically transfer content data of the primary information handling system to the different secondary information handling system further includes identifying the different secondary information handling system from the plurality of secondary information handling systems based on a priority listing of the secondary information handling systems.

8. The computer-implemented method of claim 1, wherein performing the steady state monitoring of the primary information handling system further includes:
identifying a calendar event associated with the primary information handling system; and
in response to identifying the calendar event and the battery charge level, i) accessing the battery management model including the configuration policy, ii) identifying one or more of the configuration rules based on the monitored parameters associated with the contextual inputs, and iii) applying the one or more configuration rules to perform one or more of the computer-implemented actions to automatically transfer content data of the primary information handling system to the different secondary information handling system that is associated with the primary information handling system without user interaction.

9. An information handling system, comprising:
a battery;
a memory media storing instructions;
a processor in communication with the memory media to execute the instructions to perform operations comprising:
performing, at a first time, a calibration and configuration of a battery management model, including:
identifying contextual data associated with contextual inputs to the information handling system, the contextual data including user settings contextual data, system settings contextual data, and environmental settings contextual data;
training, based on the contextual data, the battery management model, including generating a configuration policy including configuration rules, the configuration rules for performing computer-implemented actions to automatically transfer content data of the primary information handling system to a secondary information handling system of a plurality of secondary information handling systems that is associated with the primary information handling system without user interaction;
performing, at a second time, a steady-state monitoring of the primary information handling system, including:
monitoring the contextual inputs of the primary information handling system;
identifying a battery charge level of the battery of the primary information handling system; and
in response to monitoring the contextual inputs and based on the battery charge level of the battery of the primary information handling system:
identifying a particular secondary information handling system from the plurality of secondary information handling systems;
establishing a communication with the particular secondary information handling system indicating a transfer of content data from the primary information handling system;
receiving an indication that the transfer of content to the particular secondary information handling system is rejected, and in response:
i) identifying a different secondary information handling system from the plurality of secondary information handling systems, ii) accessing the battery management model including the configuration policy, iii) identifying one or more of the configuration rules based on the monitored parameters associated with the contextual inputs, and iv) applying the one or more configuration rules to perform one or more of the computer-implemented actions to automatically transfer content data of the primary information handling system to the different secondary information handling system that is associated with the primary information handling system without user interaction.

10. The information handling system of claim 9, wherein the configuration rules further include configuration rules for performing computer-implemented actions to automatically throttle one or more systems of the primary information handling system without user interaction.

11. The information handling system of claim 10, wherein applying the one or more configuration rules further includes applying the one or more configuration rules to perform computer-implemented actions to automatically throttle one or more systems of the primary information handling system without user interaction.

12. The information handling system of claim 11, wherein applying the one or more configuration rules includes adjusting a brightness level of a display of the primary information handling system.

13. The information handling system of claim 9, wherein applying the one or more configuration rules to perform one or more of the computer-implemented actions to automatically transfer content data of the primary information handling system to the different secondary information handling system further includes transferring metadata associated with the content data of the primary information handling system to the different secondary information handling system.

14. The information handling system of claim 9, wherein applying the one or more configuration rules to perform one or more of the computer-implemented actions to automatically transfer content data of the primary information handling system to the different secondary information handling system further includes identifying the different secondary information handling system from the plurality of secondary information handling systems based on a proximity of the secondary information handling systems to the primary information handling system.

15. The information handling system of claim 9, wherein applying the one or more configuration rules to perform one or more of the computer-implemented actions to automatically transfer content data of the primary information handling system to the different secondary information handling system further includes identifying the different secondary information handling system from the plurality of secondary information handling systems based on a priority listing of the secondary information handling systems.

16. The information handling system of claim 9, wherein performing the steady state monitoring of the primary information handling system further includes:
  identifying a calendar event associated with the primary information handling system; and
  in response to identifying the calendar event and the battery charge level, i) accessing the battery management model including the configuration policy, ii) identifying one or more of the configuration rules based on the monitored parameters associated with the contextual inputs, and iii) applying the one or more configuration rules to perform one or more of the computer-implemented actions to automatically transfer content data of the primary information handling system to the different secondary information handling system that is associated with the primary information handling system without user interaction.

17. A non-transitory computer-readable medium storing software comprising instructions executable by one or more computers which, upon such execution, cause the one or more computers to perform operations comprising:
  performing, at a first time, a calibration and configuration of a battery management model, including:
    identifying contextual data associated with contextual inputs to the information handling system, the contextual data including user settings contextual data, system settings contextual data, and environmental settings contextual data;
    training, based on the contextual data, the battery management model, including generating a configuration policy including configuration rules, the configuration rules for performing computer-implemented actions to automatically transfer content data of the primary information handling system to a secondary information handling system of a plurality of secondary information handling systems that is associated with the primary information handling system without user interaction;
  performing, at a second time, a steady-state monitoring of the primary information handling system, including:
    monitoring the contextual inputs of the primary information handling system;
    identifying a battery charge level of the battery of the primary information handling system; and
    in response to monitoring the contextual inputs and based on the battery charge level of the battery of the primary information handling system:
      identifying a particular secondary information handling system from the plurality of secondary information handling systems;
      establishing a communication with the particular secondary information handling system indicating a transfer of content data from the primary information handling system;
      receiving an indication that the transfer of content to the particular secondary information handling system is rejected, and in response:
        i) identifying a different secondary information handling system from the plurality of secondary information handling systems, ii) accessing the battery management model including the configuration policy, iii) identifying one or more of the configuration rules based on the monitored parameters associated with the contextual inputs, and iv) applying the one or more configuration rules to perform one or more of the computer-implemented actions to automatically transfer content data of the primary information handling system to the different secondary information handling system that is associated with the primary information handling system without user interaction.

18. The information handling system of claim 17, wherein the configuration rules further include configuration rules for performing computer-implemented actions to automatically throttle one or more systems of the primary information handling system without user interaction.

19. The information handling system of claim 18, wherein applying the one or more configuration rules further includes applying the one or more configuration rules to perform computer-implemented actions to automatically throttle one or more systems of the primary information handling system without user interaction.

20. The information handling system of claim 19, wherein applying the one or more configuration rules includes adjusting a brightness level of a display of the primary information handling system.

* * * * *